United States Patent
Watanabe

(10) Patent No.: US 10,892,831 B2
(45) Date of Patent: Jan. 12, 2021

(54) MACH-ZEHNDER OPTICAL MODULATOR AND OPTICAL MODULATION METHOD

(71) Applicant: Fujitsu Optical Components Limited, Kawasaki (JP)

(72) Inventor: Manabu Watanabe, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 16/738,450

(22) Filed: Jan. 9, 2020

(65) Prior Publication Data

US 2020/0272018 A1 Aug. 27, 2020

(30) Foreign Application Priority Data

Feb. 26, 2019 (JP) .................................. 2019-032860

(51) Int. Cl.
| | | |
|---|---|---|
| *H04B 10/50* | (2013.01) |
| *G02F 1/01* | (2006.01) |
| *H04B 10/516* | (2013.01) |
| *G02F 1/225* | (2006.01) |
| *G02B 6/293* | (2006.01) |
| *G02F 1/21* | (2006.01) |

(52) U.S. Cl.
CPC ... *H04B 10/50575* (2013.01); *G02B 6/29352* (2013.01); *G02F 1/0123* (2013.01); *G02F 1/2257* (2013.01); *H04B 10/516* (2013.01); *G02F 1/0121* (2013.01); *G02F 1/225* (2013.01); *G02F 2001/212* (2013.01)

(58) Field of Classification Search
None
See application file for complete search history.

(56) References Cited

U.S. PATENT DOCUMENTS

| | | | |
|---|---|---|---|
| 10,742,324 B1* | 8/2020 | Padmaraju | H04B 10/5053 |
| 2012/0155865 A1* | 6/2012 | Kawakami | H04B 10/50575 |
| | | | 398/43 |
| 2018/0196328 A1 | 7/2018 | Furuya | |
| 2018/0267340 A1* | 9/2018 | Rohde | H04L 27/2096 |
| 2018/0267384 A1* | 9/2018 | Padmaraju | G02F 1/0123 |

FOREIGN PATENT DOCUMENTS

| | | |
|---|---|---|
| JP | 2018-112654 | 7/2018 |
| WO | WO 2008/051429 A2 | 5/2008 |

* cited by examiner

*Primary Examiner* — Jerry Rahll
(74) *Attorney, Agent, or Firm* — Staas & Halsey LLP

(57) ABSTRACT

A Mach-Zehnder optical modulator creates a first driving signal to be applied to a first section, and a second driving signal to be applied to a second section, and includes a generator, an optical modulator, and a setting unit. The generator generates a first dither signal and a second dither signal. The optical modulator optical modulates an optical signal into a quaternary or more value optical modulation signal by applying the first driving signal superimposed by the first dither signal, and by applying the second driving signal superposed by the second dither signal. The setting unit sets, when a length of the second section is n times as long as the first section, the first dither signal and the second dither signal to have a same phase, and sets such that an amplitude of the first dither signal is n times as large as that of the second dither signal.

7 Claims, 14 Drawing Sheets

MACH-ZEHNDER OPTICAL MODULATOR AND OPTICAL MODULATION METHOD

CROSS-REFERENCE TO RELATED APPLICATION

This application is based upon and claims the benefit of priority of the prior Japanese Patent Application No. 2019-032860, filed on Feb. 26, 2019, the entire contents of which are incorporated herein by reference.

FIELD

The embodiments discussed herein are related to a Mach-Zehnder optical modulator and an optical modulation method.

BACKGROUND

For example, optical modules supporting 400G Ethernet (registered trademark) have been being developed, and to increase the bit rate, there is a standard using pulse amplitude modulation 4 (PAM4). A 400G optical transmission device using PAM4 uses a PAM4 signal at 25G baud rate used for input and output of electrical signals, and inputs and outputs electrical signals of 50 gigabits per second (Gbps) per one lane of electrical signal, and electrical signals of 400 Gbps, for example, by using eight lanes. In input and output of optical signals, carrying a PAM4 signal at 50G baud rate on one optical wavelength, optical reception and optical transmission of 100 Gbps per one wavelength, that is, 400 Gbps by using four wavelengths, are possible.

In such an optical transmission device, for example, an optical modulator using a Mach-Zehnder interferometer (MZI) is used. As typical optical modulators of MZI, for example, an LiNbO$_3$ modulator, an InP-compound semiconductor modulator, a silicone photonics modulator, and the like are available. In a silicone photonics MZI having a MOS structure, by applying a driving signal to a section (electrode) of a lower arm of the MZI, a refractivity change is generated in the MOS structure, and a phase difference in an optical wave traveling through an upper arm and the lower arm is thereby generated. As a result, optical waves having phase differences are multiplexed, and light intensity modulation is caused by interference.

However, the MZI corrects an optimal point of the driving signal, for example, due to aged deterioration, temperature variation, and the like. FIG. 14 is an illustration of an example of a driving signal that is output to a conventional MZI 100. As a method of controlling the driving signal of the MZI 100 to an optimal point, a driving signal (application voltage) on which a dither signal of a sine modulation is superimposed in an amplitude direction is applied to an electrode (section) 100A. FIG. 15 is an illustration of an example of a driving signal and an optical output power of the conventional MZI 100. In the MZI 100, when a bias voltage is controlled to an optimal point, a frequency component of the dither signal becomes absent in an average value of the optical output power as illustrated in FIG. 15 (for example, Japanese Laid-open Patent Publication No. 2018-112654, International Publication Pamphlet No. 2008/051429).

However, for example, in the MZI that performs optical modulation into a quaternary optical modulation signal, such as PAM4, in the case of a driving signal on which a dither signal is superimposed in an amplitude direction of a main signal, a frequency component of the dither signal is generated in an optical output signal. As a result, because multi-value signal is input within the same optical level, a power difference among respective optical levels is small, and a variation in optical level due to a variation of the driving signal causes degradation of the signal quality. Accordingly, the signal quality is degraded by the dither signal in a quaternary or more value optical modulation signal.

SUMMARY

According to an aspect of an embodiment, a Mach-Zehnder optical modulator includes a first section, a second section, a creating unit, a generating unit, an optical modulating unit and a setting unit. The first section and a second section are arranged in at least one arm out of two arms in an optical waveguide through which an optical signal passes. The creating unit creates a first driving signal to be applied to the first section, and a second driving signal to be applied to the second section. The generating unit generates a first dither signal to be superimposed on the first driving signal, and a second dither signal to be superimposed on the second driving signal. The optical modulating unit optical modulates the optical signal into a quaternary or more value optical modulation signal by applying the first driving signal on which the first dither signal is superimposed to the first section, and by applying the second driving signal on which the second dither signal is superimposed to the second section. The setting unit sets, when a length of the second section is n times as long as the length of the first section, the first dither signal and the second dither signal to have a same phase, and sets such that an amplitude of the first dither signal is n times as large as the amplitude of the second dither signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments a not intended to limit the disclosed technique. The following respective embodiments can be combined as appropriate.

[a] First Embodiment

Figure 1:
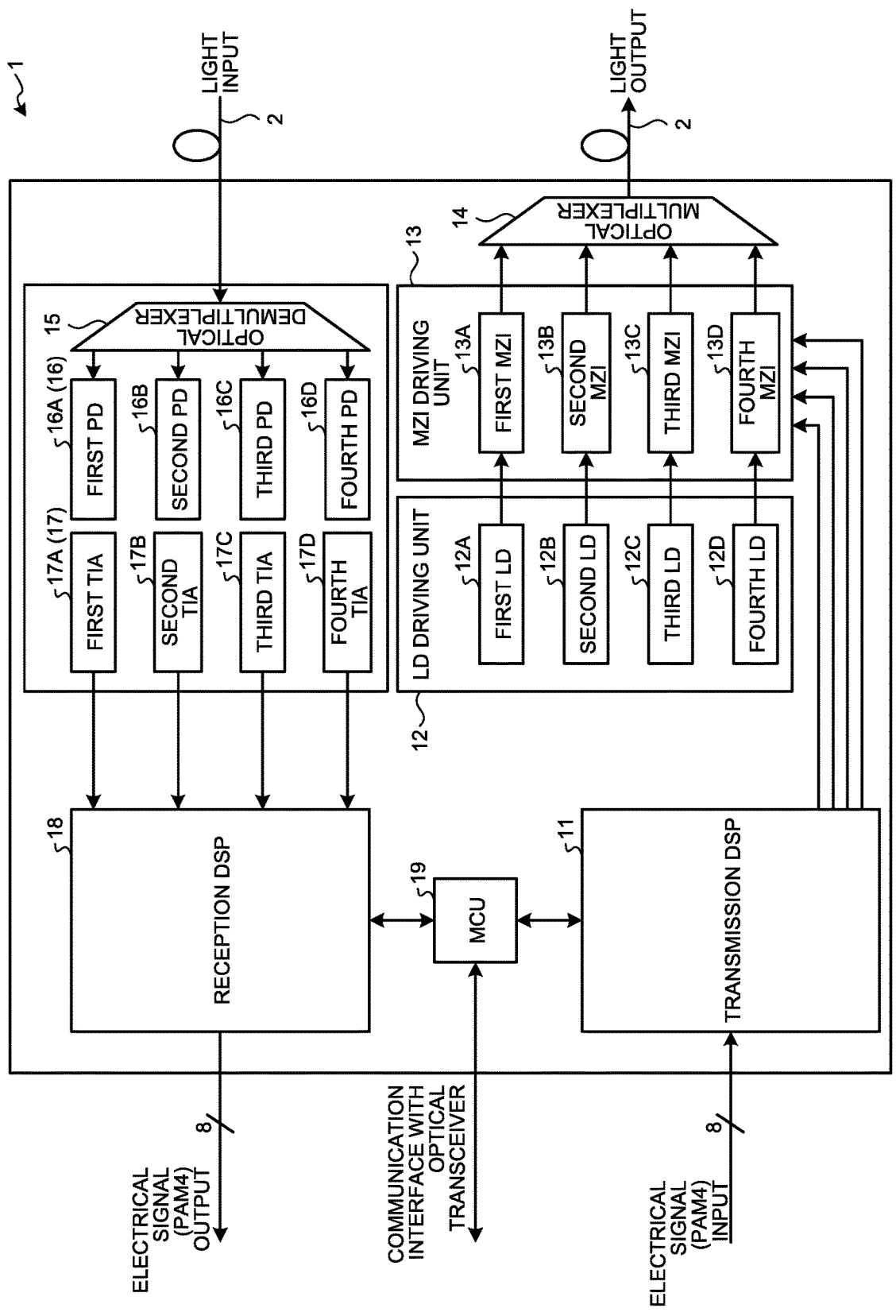
FIG. 1 is an illustration of an example of an optical transmission device according to a first embodiment.

FIG. 1 is an illustration of an example of an optical transmission device 1 according to a first embodiment. The optical transmission device 1 illustrated in FIG. 1 is an optical transceiver supporting 400 Gbps. The optical transmission device 1 includes a transmission DSP 11, an LD driving unit 12, an MZI driving unit 13, and an optical multiplexer 14. Furthermore, the optical transmission device 1 includes an optical demultiplexer 15, a photo diode (PD) group 16, a trans-impedance amplifier (TIA) group 17, a reception DSP 18, and a micro controller unit (MCU) 19.

The transmission DSP 11 receives eight PAM4 electrical signals, and outputs a set of two PAM4 electrical signals to the MZI driving unit 13 as a driving signal. The LD driving unit 12 includes a first LD 12A to a fourth LD 12D. The MZI driving unit 13 includes a first MZI 13A to a fourth MZI 13D. The LD driving unit 12 and the MZI driving unit 13 are arranged for each set of PAM4 electrical signal. The first LD 12A to the fourth LD 12D are light sources that emit an optical signal of a predetermined wavelength by direct current light emission.

The first MZI 13A to the fourth MZI 13D are, for example, an LiNbO$_3$ modulator, an InP-compound semiconductor modulator, a silicone photonics modulator, or the like. The first MZI 13A subjects a direct current light to intensity modulation by applying the driving signal from the transmission DSP 11 to an optical waveguide 21 through which the direct current light from the first LD 12A passes, and outputs quaternary optical modulation signal of level 0 to level 3. The second MZI 13B subjects a direct current light to intensity modulation by applying the driving signal from the transmission DSP 11 to an optical waveguide 21 through which the direct current light from the second LD 12B passes, and outputs quaternary optical modulation signal. The third MZI 13C subjects a direct current light to intensity modulation by applying the driving signal from the transmission DSP 11 to an optical waveguide 21 through which the direct current light from the third LD 12C passes, and outputs quaternary optical modulation signal. The fourth MZI 13D subjects a direct current light to intensity modulation by applying the driving signal from the transmission DSP 11 to an optical waveguide 21 through which the direct current light from the fourth LD 12D passes, and outputs quaternary optical modulation signal. The optical multiplexer 14 multiplexes the optical modulation signals from the first MZI 13A to the fourth MZI 13D, and outputs the multiplexed optical modulation signal to an optical fiber 2.

The optical demultiplexer 15 demultiplexes the optical modulation signal received from the optical fiber 2, and outputs demultiplexed optical modulation signals to a first PD 16A to a fourth PD 16D in the PD group 16. The first PD 16A subjects the optical modulation signal to electric conversion, and outputs the modulation signal subjected to electric conversion to a first TIA 17A. The first TIA 17A amplifies the modulation signal, and outputs the amplified modulation signal to the reception DSP 18. The second PD 16B subjects the optical modulation signal to electric conversion, and outputs the modulation signal subjected to electric conversion to a second TIA 17B. The second TIA 17B amplifies the modulation signal, and outputs the amplified modulation signal to the reception DSP 18. The third PD 16C subjects the optical modulation signal to electric conversion, and outputs the modulation signal subjected to electric conversion to a third TIA 17C. The third TIA 17C amplifies the modulation signal, and outputs the amplified modulation signal to the reception DSP 18. The fourth PD 16D subjects the optical modulation signal to electric conversion, and outputs the modulation signal subjected to electric conversion to a fourth TIA 17D. The fourth TIA 17D amplifies the modulation signal, and outputs the amplified modulation signal to the reception DSP 18. The reception DSP 18 demodulates the modulation signal of each signal to a PAM4 signal, and outputs the demodulated PAM4 signal.

Figure 2:
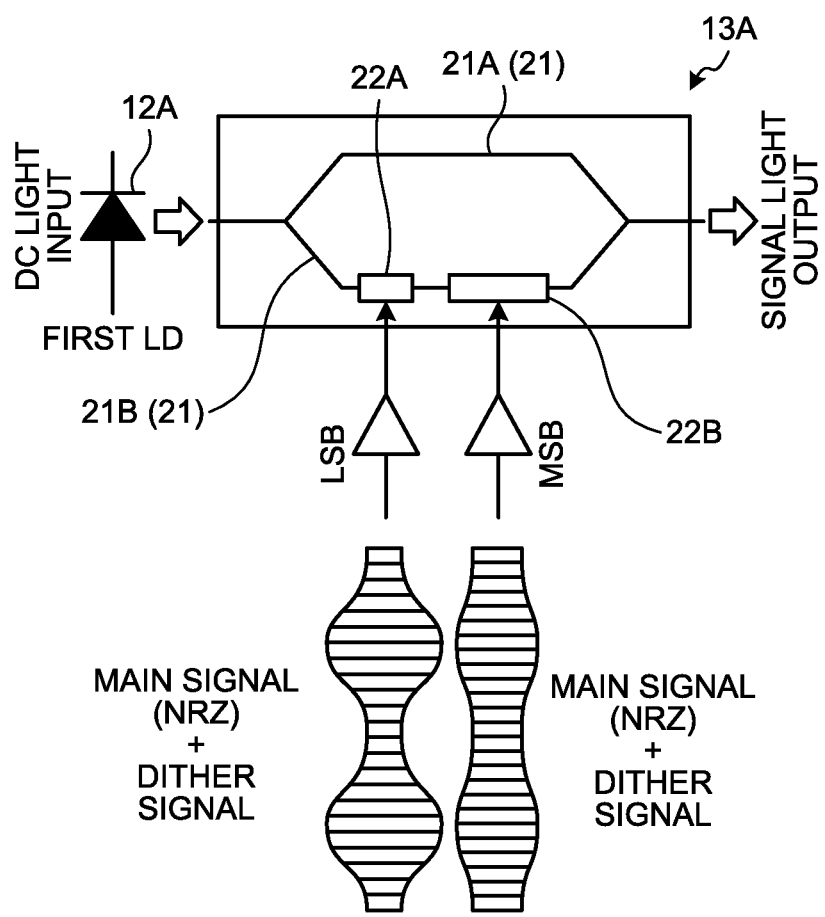
FIG. 2 is an illustration of an example of each driving signal applied to an LSB section and an MSB section of a first MZI.

FIG. 2 is an illustration of an example of each driving signal applied to an LSB section 22A and an MSB section 22B of the first MZI 13A. The first MZI 13A includes the optical waveguide 21 having an upper arm 21A and a lower arm 21B, and a modulation section arranged at the lower arm 21B of the optical waveguide 21. The modulation section includes the first section (LSB section) 22A and the second section (MSB section) 22B. The ratio of electrode length of the LSB section 22A to the MSB section 22B is 1:2. The first MZI 13A inputs a direct current light from the first LD 12A to the optical waveguide 21, applies an LSB driving signal from a first generating unit 32A to the LSB section 22A, and applies an MSB driving signal from the first generating unit 32A to the MSB section 22B. The LSB driving signal is a first driving signal in which a dither signal is superimposed on a non return-to-zero (NRZ) signal. The MSB driving signal is a second driving signal in which a dither signal is superimposed on an NRZ signal.

When the ratio of electrode length of the LSB section 22A to the MSB section 22B is 1:2, and when the amplitude of a reference dither signal to be superimposed on the MSB driving signal is one time, the amplitude of the dither signal to be superimposed on the LSB driving signal is two times as large as that of the reference dither signal. When the electrode length of the LSB section:the electrode length of the MSB section=1:2, the amplitude of the first dither signal:the amplitude of the second dither signal=2:1.

Figure 3:
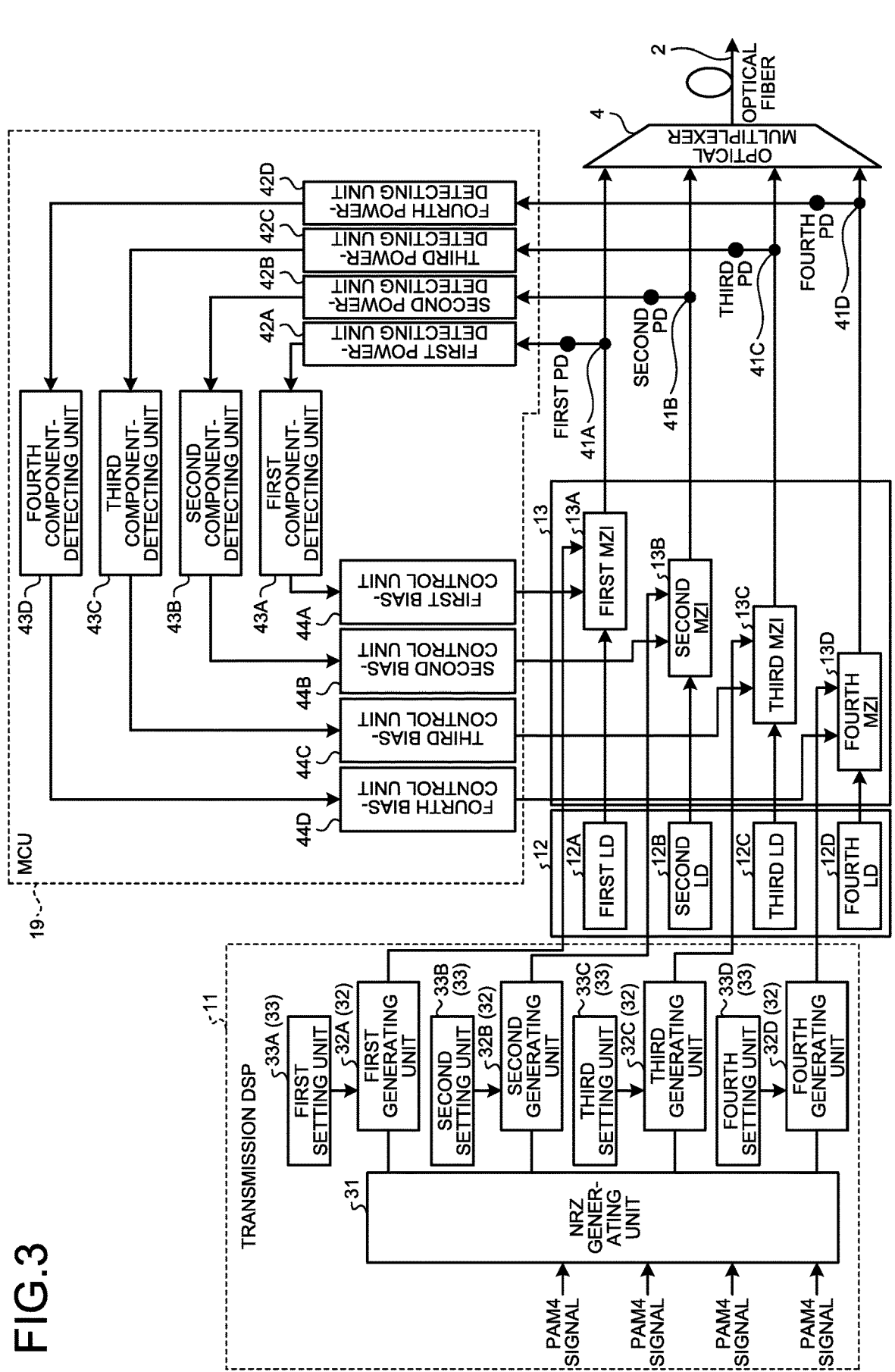
FIG. 3 is an illustration of an example of a transmission digital signal processor (DSP), a laser diode (LD) driving unit, an MZI driving unit, and a micro controller unit (MCU)

FIG. 3 is an illustration of an example of the transmission DSP 11, the LD driving unit 12, the MZI driving unit 13, and the MCU 19. The transmission DSP 11 includes an NRZ generating unit 31, a generating unit 32, and a setting unit 33. The NRZ generating unit 31 converts a PAM4 electrical signal, which is a set of two main signals, into an NRZ signal. The generating unit 32 includes the first generating unit 32A to a fourth generating unit 32D. The setting unit 33 includes a first setting unit 33A to a fourth setting unit 33D.

The first generating unit 32A generates the dither signal to be superimposed on the NRZ signal, and generates the LSB driving signal and the MSB driving signal to be applied to the first MZI 13A by superimposing the dither signal on the NRZ signal. The first generating unit 32A generates the LSB driving signal by superimposing the dither signal having an amplitude two times as large as the reference on the NRZ signal, and generates the MSB driving signal by superimposing the dither signal having the reference amplitude on the same NRZ signal. The first generating unit 32A applies the LSB driving signal to the LSB section 22A of the first MZI 13A, and applies the MSB driving signal to the MSB section 22B of the first MZI 13A. When the electrode length of the LSB section:the electrode length of the MSB section=1:2, the first setting unit 33A sets, based on the dither signal to be superimposed on the MSB driving signal as a reference, the dither signal to be superimposed on the LSB driving signal to be two times as large as the reference in the first generating unit 32A.

The second generating unit 32B generates the dither signal to be superimposed on the NRZ signal, and generates the LSB driving signal and the MSB driving signal to be applied to the second MZI 13B by superimposing the dither signal on the NRZ signal. The second generating unit 32B generates the LSB driving signal by superimposing the dither signal having an amplitude two times as large as the reference on the NRZ signal, and generates the MSB driving signal by superimposing the dither signal having the reference amplitude on the same NRZ signal. The second generating unit 32B applies the LSB driving signal to the LSB section 22A of the second MZI 13B, and applies the MSB driving signal to the MSB section 22B of the second MZI 13B. When the electrode length of the LSB section:the electrode length of the MSB section=1:2, the second setting unit 33B sets, based on the dither signal to be superimposed on the MSB driving signal as a reference, the dither signal to be superimposed on the LSB driving signal to be two times as large as the reference in the second generating unit 32B.

The third generating unit 32C generates the dither signal to be superimposed on the NRZ signal, and generates the LSB driving signal and the MSB driving signal to be applied to the third MZI 13C by superimposing the dither signal on the NRZ signal. The third generating unit 32C generates the LSB driving signal by superimposing the dither signal having an amplitude two times as large as the reference on the NRZ signal, and generates the MSB driving signal by superimposing the dither signal having the reference amplitude on the same NRZ signal. The third generating unit 32C applies the LSB driving signal to the LSB section 22A of the third MZI 13C, and applies the MSB driving signal to the MSB section 22B of the third MZI 13C. When the electrode length of the LSB section:the electrode length of the MSB section=1:2, the third setting unit 33C sets, based on the dither signal to be superimposed on the MSB driving signal as a reference, the dither signal to be superimposed on the LSB driving signal to two times as large as the reference in the third generating unit 32C.

The fourth generating unit 32D generates the dither signal to be superimposed on the NRZ signal, and generates the LSB driving signal and the MSB driving signal to be applied to the fourth MZI 13D by superimposing the dither signal on the NRZ signal. The fourth generating unit 32D generates the LSB driving signal by superimposing the dither signal having the reference amplitude on the NRZ signal, and generates the MSB driving signal by superimposing the dither signal having the reference amplitude on the same NRZ signal. The fourth generating unit 32D applies the LSB driving signal to the LSB section 22A of the fourth MZI 13D, and applies the MSB driving signal to the MSB section 22B of the fourth MZI 13D. When the electrode length of the LSB section 22A:the electrode length of the MSB section 22B=1:2, the fourth setting unit 33D sets, based on the dither signal to be superimposed on the MSB driving signal as a reference, the dither signal to be superimposed on the LSB driving signal to two times as large as the reference in the fourth generating unit 32D.

Figure 4:
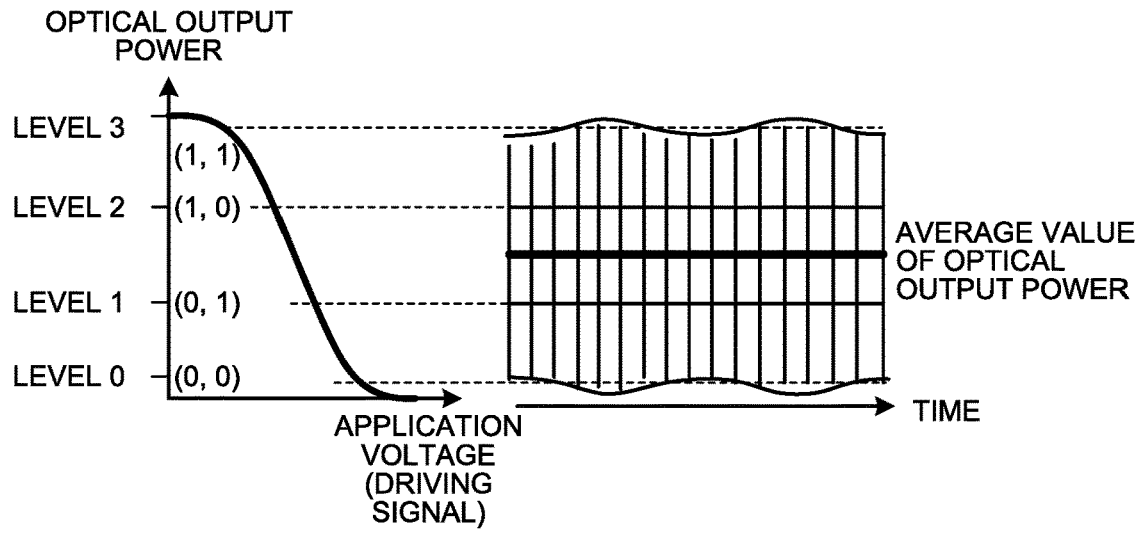
FIG. 4 is an illustration of an example of a driving signal and an optical output power of the first MZI.

FIG. 4 is an illustration of an example of a driving signal and an optical output power of the first MZI 13A. The first MZI 13A inputs a direct current light from the first LD 12A to the optical waveguide 21, applies an LSB driving signal from a first generating unit 32A to the LSB section 22A, and applies an MSB driving signal from the first generating unit 32A to the MSB section 22B. The first MZI 13A subjects a direct current light to intensity modulation according to the LSB driving signal and the MSB driving signal. As a result, in the quaternary optical modulation signal of the first MZI 13A, dither signals of a level 1 and a level 2 are canceled out by each other as illustrated in FIG. 4, and degradation of the signal quality by the dither signals at the level 1 and the level 2 can be thereby suppressed. The first MZI 13A outputs the quaternary optical modulation signal, degradation of the signal quality of which is suppressed to the optical multiplexer 14.

The second MZI 13B inputs a direct current light from the second LD 12B to the optical waveguide 21, applies an LSB driving signal from a second generating unit 32B to the LSB section 22A, and applies an MSB driving signal from the second generating unit 32B to the MSB section 22B. The second MZI 13B subjects a direct current light to intensity modulation according to the LSB driving signal and the MSB driving signal. As a result, in the quaternary optical modulation signal of the second MZI 13B, dither signals of the level 1 and the level 2 are canceled out by each other, and degradation of the signal quality by the dither signals at the level 1 and the level 2 can be thereby suppressed. The second MZI 13B outputs the quaternary optical modulation signal, degradation of the signal quality of which is suppressed to the optical multiplexer 14.

The third MZI 13C inputs a direct current light from the third LD 12C to the optical waveguide 21, applies an LSB driving signal from a third generating unit 32C to the LSB section 22A, and applies an MSB driving signal from the third generating unit 32C to the MSB section 22B. The third MZI 13C subjects a direct current light to intensity modulation according to the LSB driving signal and the MSB driving signal. As a result, in the quaternary optical modulation signal of the third MZI 13C, dither signals of the level 1 and the level 2 are canceled out by each other, and degradation of the signal quality by the dither signals at the level 1 and the level 2 can be thereby suppressed. The third MZI 13C outputs the quaternary optical modulation signal, degradation of the signal quality of which is suppressed to the optical multiplexer 14.

The fourth MZI 13D inputs a direct current light from the fourth LD 12D to the optical waveguide 21, applies an LSB driving signal from a fourth generating unit 32D to the LSB section 22A, and applies an MSB driving signal from the fourth generating unit 32D to the MSB section 22B. The fourth MZI 13D subjects a direct current light to intensity modulation according to the LSB driving signal and the MSB driving signal. As a result, in the quaternary optical modulation signal of the fourth MZI 13D, dither signals of the level 1 and the level 2 are canceled out by each other, and degradation of the signal quality by the dither signals at the level 1 and the level 2 can be thereby suppressed. The fourth MZI 13D outputs the quaternary optical modulation signal, degradation of the signal quality of which is suppressed to the optical multiplexer 14.

A first PD 41A electric converts a part of the optical modulation signal from the first MZI 13A. A second PD 41B electric converts a part of the optical modulation signal from the second MZI 13B. A third PD 41C electric converts a part of the optical modulation signal from the third MZI 13C. A fourth PD 41D electric converts a part of the optical modulation signal from the fourth MZI 13D. An MCU 19 includes a power detecting unit 42, a component detecting unit 43, and a bias control unit 44. The power detecting unit 42 includes a first power-detecting unit 42A to a fourth power-detecting unit 42D. The component detecting unit 43 includes a first component-detecting unit 43A to a fourth component-detecting unit 43D. The bias control unit 44 include a first bias-control unit 44A to a fourth bias-control unit 44D. The first power-detecting unit 42A detects an optical power from the modulation signal of the first PD 41A. The second power-detecting unit 42B detects an optical power from the modulation signal of the second PD 41B. The third power-detecting unit 42C detects an optical power from the modulation signal of the third PD 41C. The fourth power-detecting unit 42D detects an optical power from the modulation signal of the fourth PD 41D.

The first component-detecting unit 43A detects a frequency component of a dither signal from the modulation signal of the first PD 41A. The second component-detecting unit 43B detects a frequency component of a dither signal from the modulation signal of the second PD 41B. The third component-detecting unit 43C detects a frequency component of a dither signal from the modulation signal of the third PD 41C. The fourth component-detecting unit 43D detects a frequency component of a dither signal from the modulation signal of the fourth PD 41D.

The first bias-control unit 44A performs automatic bias control (ABC) to control each bias value so that biases of the upper arm 21A and the lower arm 21B converge to an optimal point based on the frequency component of the dither signal detected by the first component-detecting unit 43A. As a result, the first bias-control unit 44A performs the ABC such that the frequency component of the dither signal detected by the first component-detecting unit 43A is minimized although the frequency components of the dither signals at level 0 and level 3 appear strongly. Consequently, the biases of the upper arm 21A and the lower arm 21B can converge to an optimal point.

The second bias-control unit 44B performs ABC to control each bias value so that biases of the upper arm 21A and the lower arm 21B converge to an optimal point based on the frequency component of the dither signal detected by the second component-detecting unit 43B. As a result, the second bias-control unit 44B performs the ABC such that the frequency component of the dither signal detected by the second component-detecting unit 43B is minimized although the frequency components of the dither signals at level 0 and level 3 appear strongly. Consequently, the biases of the upper arm 21A and the lower arm 21B can converge to an optimal point.

The third bias-control unit 44C performs ABC to control each bias value so that biases of the upper arm 21A and the lower arm 21B converge to an optimal point based on the frequency component of the dither signal detected by the third component-detecting unit 43C. As a result, the third bias-control unit 44C performs the ABC such that the frequency component of the dither signal detected by the third component-detecting unit 43C is minimized although the frequency components of the dither signals at level 0 and level 3 appear strongly. Consequently, the biases of the upper arm 21A and the lower arm 21B can converge to an optimal point.

The fourth bias-control unit 44D performs ABC to control each bias value so that biases of the upper arm 21A and the lower arm 21B converge to an optimal point based on the frequency component of the dither signal detected by the fourth component-detecting unit 43D. As a result, the fourth bias-control unit 44D performs the ABC such that the frequency component of the dither signal detected by the fourth component-detecting unit 43D is minimized although the frequency components of the dither signals at level 0 and level 3 appear strongly. Consequently, the biases of the upper arm 21A and the lower arm 21B can converge to an optimal point.

The first setting unit 33A sets the first generating unit 32A to perform amplitude modulation such that a bias superimposition amount on each of the MSB section 22B and the LSB section 22A is inversely proportional to a modulation efficiency of each of the MSB section 22B and the LSB section 22A. That is, in the first MZI 13A, the dither signal is superimposed on both of the two sections (the LSB section 22A and the MSB section 22B). When signal modulation efficiencies (electrode lengths) of the LSB section 22A and the MSB section 22B are 1:2, the dither signal having the same phase as the MSB driving is set to the MSB driving signal, and the dither signal having the amplitude two times as large as the reference is set to the LSB driving signal. As a result, an influence of the dither signal on a PAM signal waveform is reduced, and degradation of the signal quality is suppressed.

In the second MZI 13B, the dither signal is superimposed on both of the LSB section 22A and the MSB section 22B. When signal modulation efficiencies (electrode lengths) of the LSB section 22A and the MSB section 22B are 1:2, the dither signal having the same phase as the MSB driving is set to the MSB driving signal, and the dither signal having the amplitude two times as large as the reference is set to the LSB driving signal. As a result, an influence of the dither signal on a PAM signal waveform is reduced, and degradation of the signal quality is suppressed.

In the third MZI 13C, the dither signal is superimposed on both of the LSB section 22A and the MSB section 22B. When signal modulation efficiencies (electrode lengths) of the LSB section 22A and the MSB section 22B are 1:2, the dither signal having the same phase as the MSB driving is set to the MSB driving signal, and the dither signal having the amplitude two times as large as the reference is set to the LSB driving signal. As a result, an influence of the dither signal on a PAM signal waveform is reduced, and degradation of the signal quality is suppressed.

In the fourth MZI 13D, the dither signal is superimposed on both of the LSB section 22A and the MSB section 22B. When signal modulation efficiencies (electrode lengths) of the LSB section 22A and the MSB section 22B are 1:2, the dither signal having the same phase as the MSB driving is set to the MSB driving signal, and the dither signal having the amplitude two times as large as the reference is set to the LSB driving signal. As a result, an influence of the dither signal on a PAM signal waveform is reduced, and degradation of the signal quality is suppressed.

By superimposing the dither signal, modulation by the dither signals of the level 1 and the level 2 are canceled out by each other among optical output power levels and, therefore, the frequency component of the dither signal becomes absent in the optical output. As a result, degradation of the signal quality by a dither signal that is used at the time of the MZI bias control can be suppressed. Moreover, the modulation by the dither signals at level 0 and level 3 appear as constructive dither signals, but the conventional bias control (ABC) is performed such that this dither signal is minimized.

Next, the principle by which the frequency components of the dither signals are canceled out by each other will be described. A phase modulation by voltage application to the LSB section 22A is $\phi_{LSB}$, and a phase modulation by voltage application to the MSB section 22B is $\phi_{MSB}$. When a phase modulation efficiency by voltage application is $\eta$, a voltage of the LSB section 22A is $V_{LSB}$, and a voltage of the MSB section 22B is $V_{MSB}$, the phase modulation of the MSB section 22B has a doubled modulation efficiency. Therefore, it can be expressed as $\phi_{LSB}=\eta V_{LSB}$, $\phi_{MSB}=2\eta V_{MSB}$.

Furthermore, the total sum $\phi$ of the optical phase modulation by the first MZI 13A can be expressed by a sum of the respective sections of $\phi=\phi_{LSB}+\phi_{MSB}=\eta V_{LSB}+2\eta V_{MSB}$. If the modulation voltage of the MSB section 22B is expressed with a main signal amplitude $V_\alpha$, an AM modulation amplitude A, a frequency $\omega$, and a phase $\theta$, the AM modulation amplitude of the demodulation voltage of the LSB section 22A is to be a doubled amplitude 2A.

Figure 5:
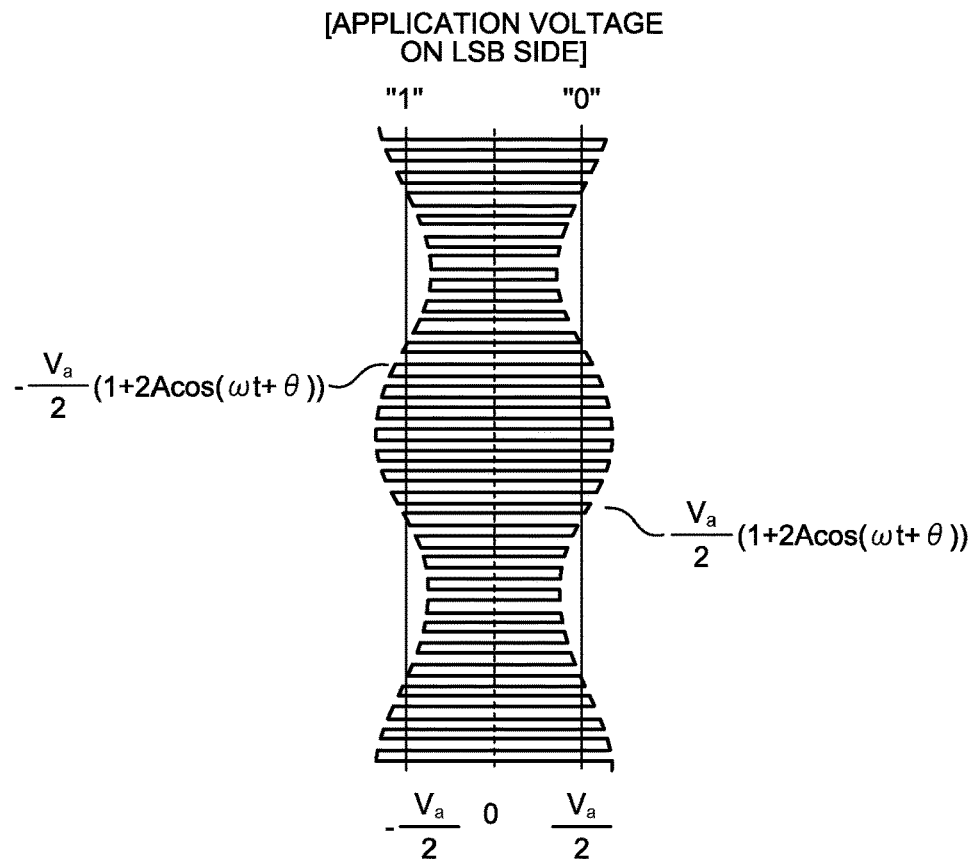
FIG. 5 is an illustration of an example of a driving signal applied to the LSB section.
Figure 6:
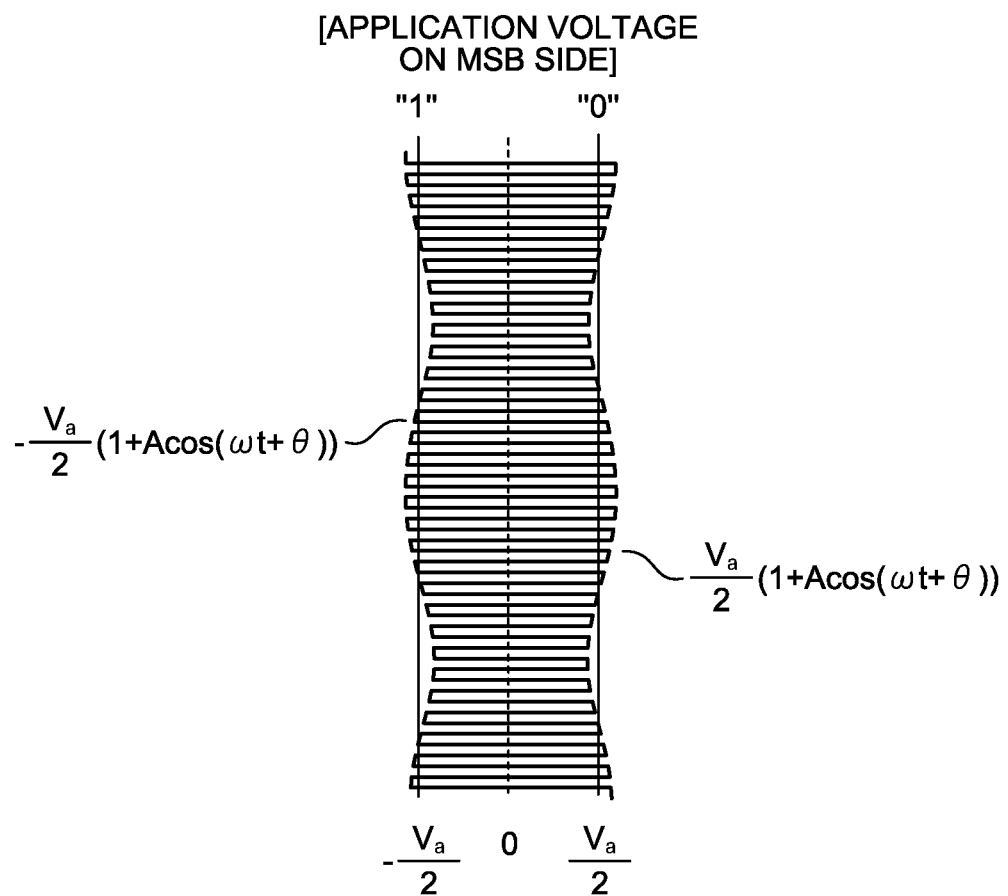
FIG. 6 is an illustration of an example of a driving signal applied to the MSB section.

FIG. 5 is an illustration of an example of a driving signal applied to the LSB section 22A, and FIG. 6 is an illustration of an example of a driving signal applied to the MSB section 22B. It is described such that a higher voltage side is a "0" side of the main signal, and a lower voltage side is "1" side of the main signal.

In the phase modulation of the level 1, as indicated in (Eq. 1), an AM modulation component (frequency component of the dither signal) of the LSB driving signal (main signal="1") and an AM modulation component of the MSB driving signal (main signal="0") cancel out each other.

$$\phi_{LSB} = \quad \text{(Eq. 1)}$$
$$\eta V_{LSB} = -\eta \frac{V_s}{2}(1 + 2A\cos(\omega t + \theta)) = -\frac{\eta}{2}V_s - \eta AV_s\cos(\omega t + \theta)$$
$$\phi_{MSB} = 2\eta V_{MSB} =$$
$$\eta V_s(1 + A\cos(\omega t + \theta)) = \eta V_s + \eta AV_s\cos(\omega t + \theta)$$
$$\phi = \phi_{LSB} + \phi_{MSB} = \eta \frac{V_s}{2}$$

In the phase modulation of the level 2, as indicated in (Eq. 2), an AM modulation component of the LSB driving signal (main signal="0") and an AM modulation component of the MSB driving signal (main signal="1") cancel out each other.

$$\phi_{LSB} = \quad \text{(Eq. 2)}$$
$$\eta V_{LSB} = \eta \frac{V_s}{2}(1 + 2A\cos(\omega t + \theta)) = \frac{\eta}{2}V_s + \eta AV_s\cos(\omega t + \theta)$$
$$\phi_{MSB} = 2\eta V_{MSB} =$$
$$-\eta V_s(1 + A\cos(\omega t + \theta)) = -\eta V_s - \eta AV_s\cos(\omega t + \theta)$$
$$\phi = \phi_{LSB} + \phi_{MSB} = -\eta \frac{V_s}{2}$$

In the phase modulation of level 0, as indicated in (Eq. 3), an AM modulation component of the LSB driving signal (main signal="0") and an AM modulation component of the MSB driving signal (main signal="0") are constructive to each other.

$$\phi_{LSB} = \quad \text{(Eq. 3)}$$
$$\eta V_{LSB} = \eta \frac{V_s}{2}(1 + 2A\cos(\omega t + \theta)) = \frac{\eta}{2}V_s + \eta AV_s\cos(\omega t + \theta)$$
$$\phi_{MSB} = 2\eta V_{MSB} =$$
$$\eta V_s(1 + A\cos(\omega t + \theta)) = \eta V_s + \eta AV_s\cos(\omega t + \theta)$$
$$\phi = \phi_{LSB} + \phi_{MSB} = \eta \frac{3V_s}{2} + 2\eta AV_s\cos(\omega t + \theta)$$

Furthermore, in the phase modulation of level 3, as indicated in (Eq. 4), an AM modulation component of the LSB driving signal (main signal="1") and an AM modulation component of the MSB driving signal (main signal="1") are constructive to each other.

$$\phi_{LSB} = \quad \text{(Eq. 4)}$$
$$\eta V_{LSB} = -\eta \frac{V_s}{2}(1 + 2A\cos(\omega t + \theta)) = -\frac{\eta}{2}V_s - \eta AV_s\cos(\omega t + \theta)$$
$$\phi_{MSB} = 2\eta V_{MSB} =$$
$$-\eta V_s(1 + A\cos(\omega t + \theta)) = -\eta V_s - \eta AV_s\cos(\omega t + \theta)$$
$$\phi = \phi_{LSB} + \phi_{MSB} = -\eta \frac{3V_s}{2} - 2\eta AV_s\cos(\omega t + \theta)$$

The first setting unit 33A sets as the electrode length of the LSB section 22A:the electrode length of the MSB section 22B to 1:2, and the amplitude of the dither signal of the LSB driving signal:the amplitude of the dither signal of the MSB driving signal to 2:1. The first bias-control unit 44A controls a bias voltage of the first MZI 13A such that the frequency component of the dither signal is minimized based on the frequency component of the dither signal of the first component-detecting unit 43A in the first MZI 13A. As a result, in the first MZI 13A to generate multi-value PAM signal, degradation of the signal quality by the dither signal for bias control can be suppressed.

Figure 7:
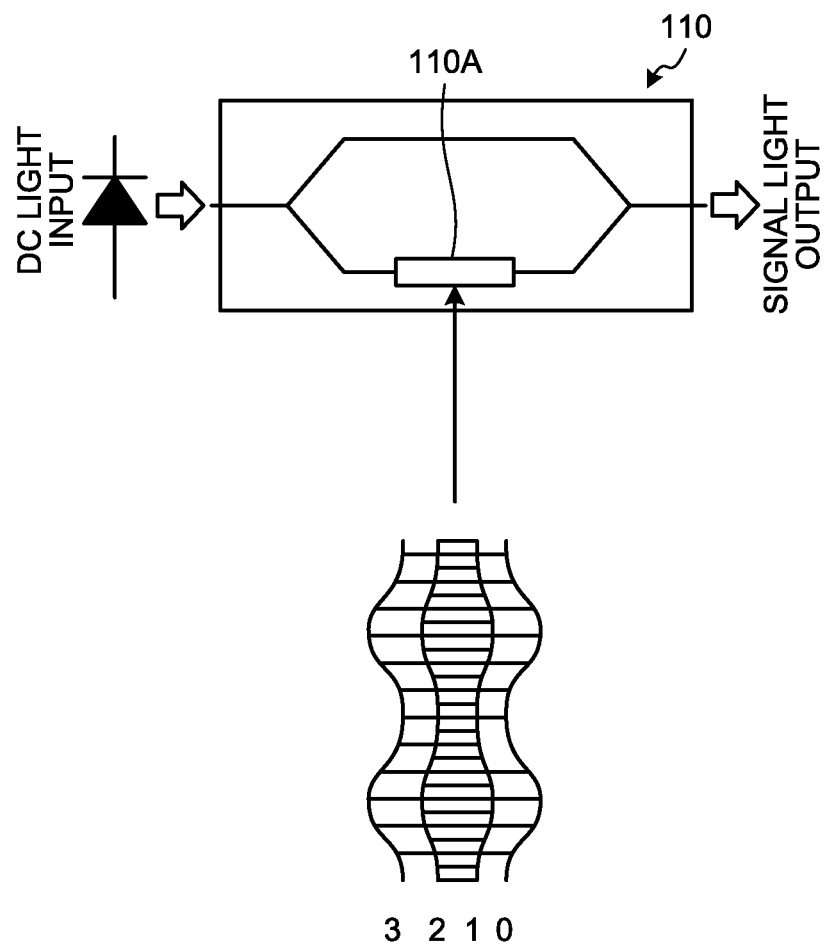
FIG. 7 is an illustration of an example of a driving signal applied to an MZI of a comparative example.
Figure 8:
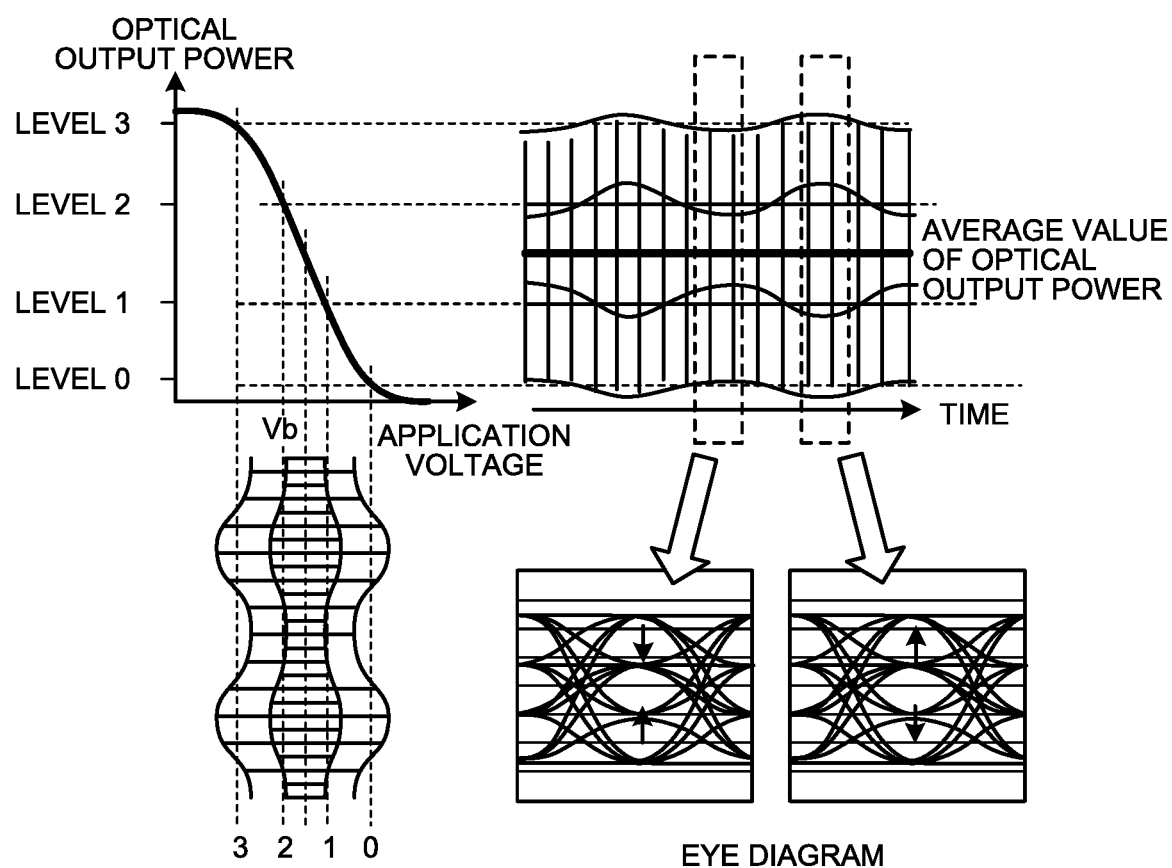
FIG. 8 is an illustration of an example of a driving signal and an optical output power of the comparative example.
Figure 9:
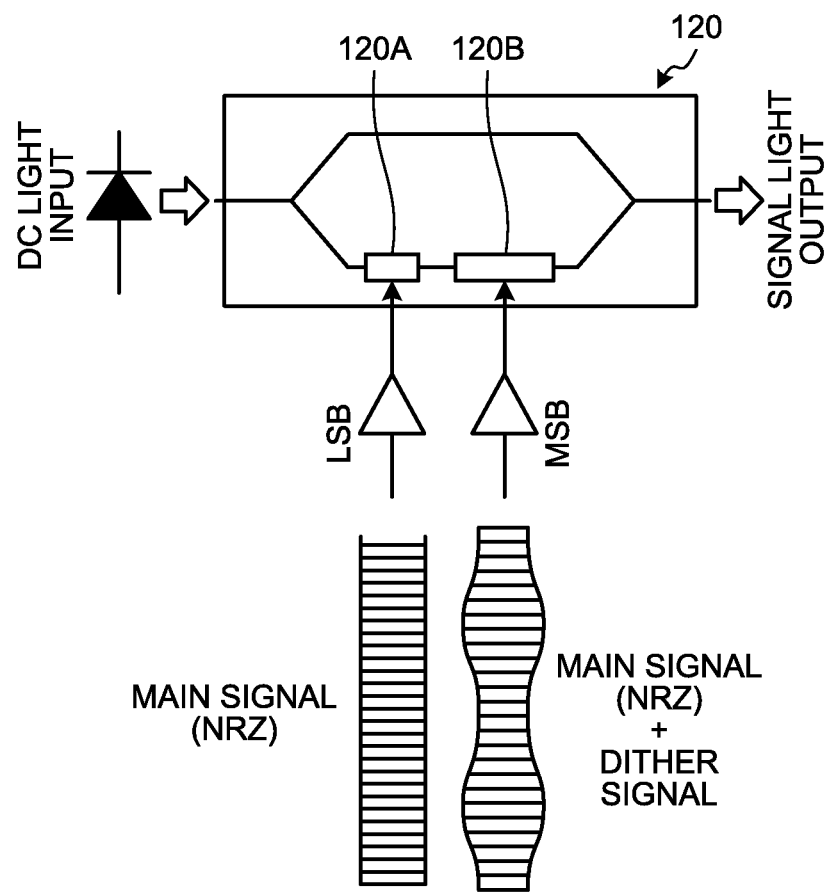
FIG. 9 is an illustration of an example of a driving signal applied to the MZI of the comparative example.
Figure 10:
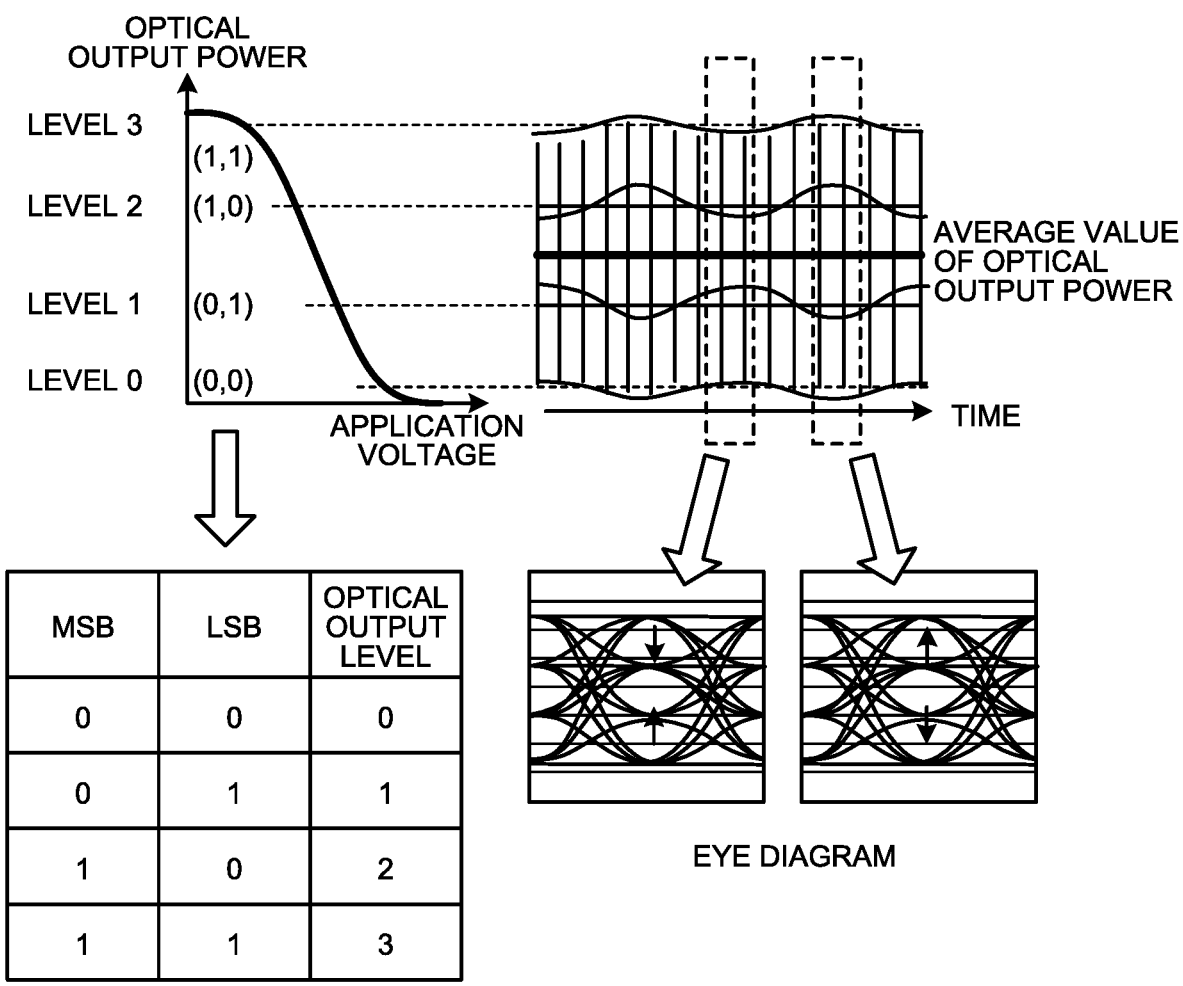
FIG. 10 is an illustration of an example of a driving signal and an optical output power of the comparative example.
Figure 15:
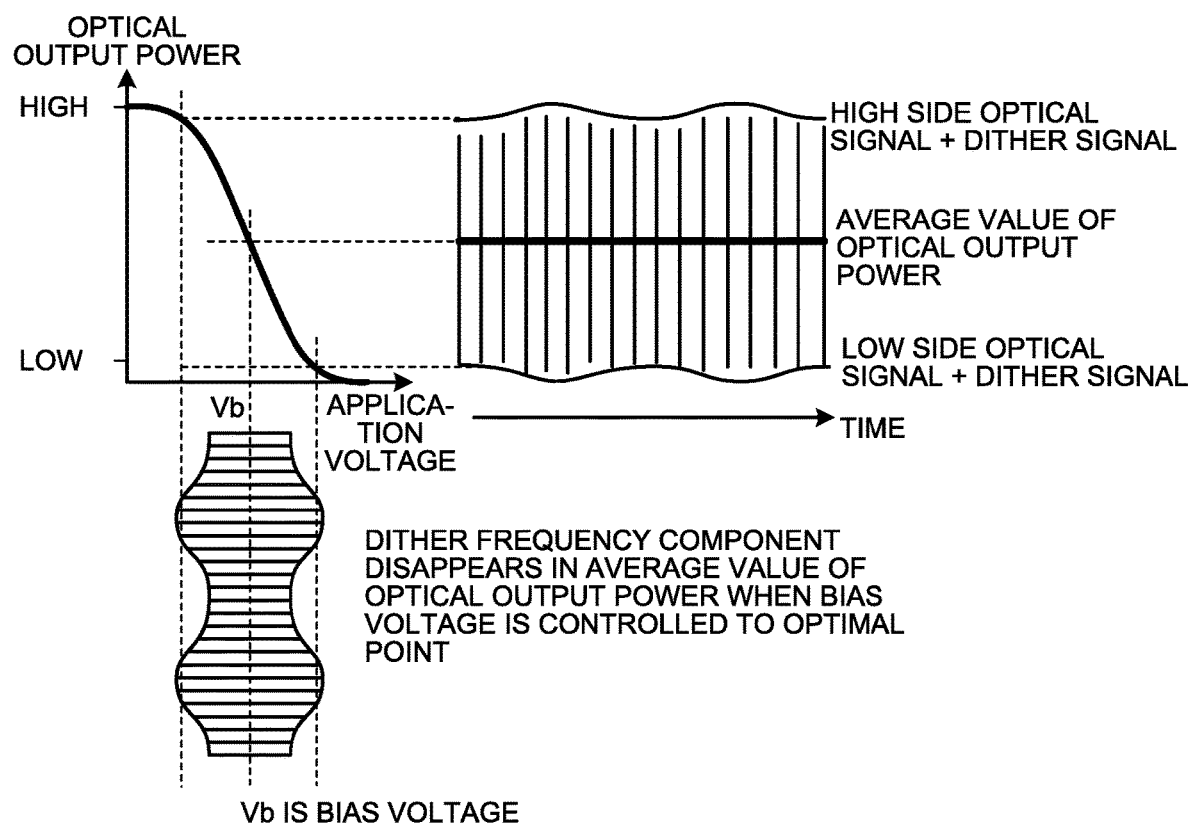
FIG. 15 is an illustration of an example of a driving signal and an optical output power of the conventional MZI.

FIG. 7 is an illustration of an example of a driving signal applied to an MZI 110 of a comparative example, and FIG. 8 is an illustration of an example of a driving signal and an optical output power of the comparative example. The MZI 110 of a comparative example has a single section 110A arranged at the lower arm, and applies quaternary driving signal of level 0 to 3 in which a dither signal is superimposed on a PAM4 signal, to the section 110A. In the quaternary driving signal, power differences among the optical levels are small compared to the binary NRZ signal illustrated in FIG. 15 because multi-value signals are input in the same optical level, and it is prone to cause degradation of the signal quality by variations of the optical levels due to variations of the driving signal of the MZI 110. When a dither signal for bias control is superimposed on a PAM4 signal, because an intermediate level (the level 1 and the level 2 in FIG. 8) among four values are close to a region of varying linearly with respect to an application voltage, the frequency component of the dither signal significantly affects as a fluctuation of the optical level. As a result, the eye opening repeatedly opens and closes according to a cycle of the dither signal FIG. 9 is an illustration of an example of a driving signal applied to an MZI 120 of a comparative example, and FIG. 10 is an illustration of an example of a driving signal and an optical output power of the comparative example. The MZI 120 of the comparative example has an LSB section 120A and an MSB section 120B arranged in a lower arm. In the MSB section 120B, the modulation efficiency is increased and an optical phase variation is large compared to the LSB section 120A. The MZI 120 applies a driving signal on which a dither signal is superimposed on an NRZ signal to the LSB section 120A. The MZI 120 applies a driving signal on which a dither signal is superimposed on an NRZ signal to the MSB section 120B. As a result, the level 1 and the level 2 in the eye opening are to be significantly deformed.

On the other hand, in the first MZI 13A of the first embodiment, the electrode length of the MSB section 22B: the electrode length of the LSB section 22A are set to 1:2. Furthermore, the first MZI 13A applies the LSB driving signal in which the reference dither signal is superimposed on the NRZ signal to the MSB section 22B, and applies the MSB driving signal in which the dither signal having two times as large as the reference is superimposed on the NRZ signal to the LSB section 22A. As a result, in the first MZI 13A, the power differences among the optical levels are large, and fluctuation of the optical level caused by variation of the driving signal of the first MZI 13A is large as illustrated in FIG. 4, and degradation of the signal quality by the dither signal can be suppressed in a quaternary optical modulation signal.

In the second MZI 13B, the electrode length of the MSB section 22B:the electrode length of the LSB section 22A are set to 1:2. Furthermore, the second MZI 13B applies the LSB driving signal in which the reference dither signal is superimposed on the NRZ signal to the MSB section 22B, and applies the MSB driving signal in which the dither signal having two times as large as the reference is superimposed on the NRZ signal to the LSB section 22A. As a result, in the second MZI 13B, the power differences among the optical levels are large, and fluctuation of the optical level caused by variation of the driving signal of the second MZI 13B is large, and degradation of the signal quality by the dither signal can be suppressed in a quaternary optical modulation signal.

In the third MZI 13C, the electrode length of the MSB section 22B:the electrode length of the LSB section 22A are set to 1:2. Furthermore, the third MZI 13C applies the LSB driving signal in which the reference dither signal is superimposed on the NRZ signal to the MSB section 22B, and applies the MSB driving signal in which the dither signal having two times as large as the reference is superimposed on the NRZ signal to the LSB section 22A. As a result, in the third MZI 13C, the power differences among the optical levels are large, and fluctuation of the optical level caused by variation of the driving signal of the third MZI 13C is large, and degradation of the signal quality by the dither signal can be suppressed in a quaternary optical modulation signal.

In the fourth MZI 13D, the electrode length of the MSB section 22B:the electrode length of the LSB section 22A are set to 1:2. Furthermore, the fourth MZI 13D applies the LSB driving signal in which the reference dither signal is superimposed on the NRZ signal to the MSB section 22B, and applies the MSB driving signal in which the dither signal having two times as large as the reference is superimposed on the NRZ signal to the LSB section 22A. As a result, in the fourth MZI 13D, the power differences among the optical levels are large, and fluctuation of the optical level caused by variation of the driving signal of the fourth MZI 13D is large, and degradation of the signal quality by the dither signal can be suppressed in a quaternary optical modulation signal.

Note that in the first MZI 13A of the first embodiment, an example in which the LSB section 22A and the MSB section 22B are arranged in the lower arm 21B has been described, but it is not limited to the lower arm 21B, and the LSB section 22A and the MSB section 22B may be arranged in the upper arm 21A, and the arrangement can be changed as appropriate. Furthermore, in the first MZI 13A, the LSB section 22A and the MSB section 22B may be arranged in both of the upper arm 21A and the lower arm 21B, and the arrangement can be changed as appropriate. Such a form of implementation will be described as a second embodiment.

[b] Second Embodiment

Figure 11:
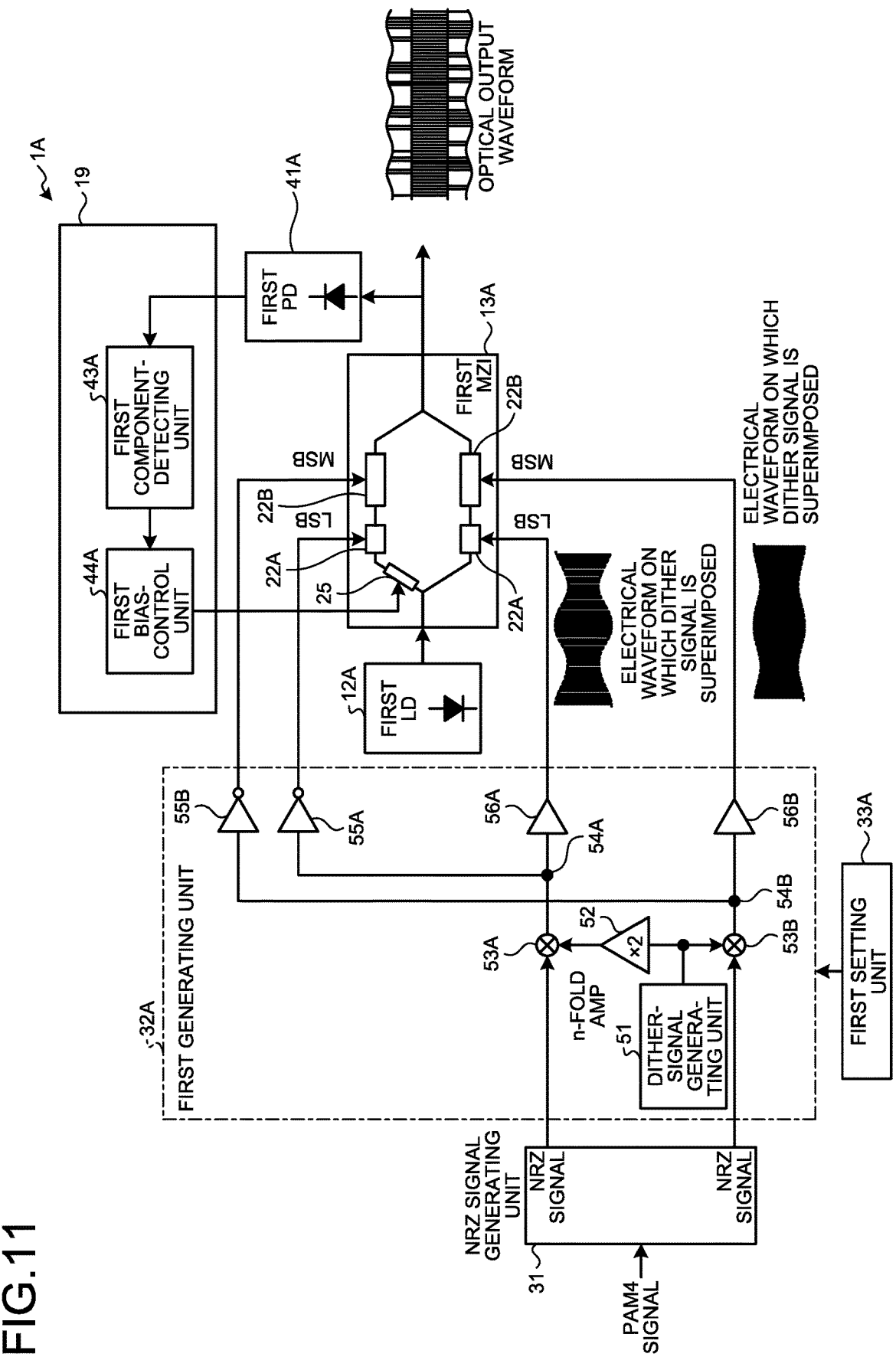
FIG. 11 is an illustration of an example of a transmission DSP, an LD driving unit, an MZI driving unit, and an MCU in an optical transmission device of a second embodiment.

FIG. 11 is an illustration of an example of the transmission DSP 11, the LD driving unit 12, the MZI driving unit 13, and the MCU 19 in an optical transmission device 1A of the second embodiment. Common reference signs are assigned to common components with the optical transmission device 1 of the first embodiment, and explanation of duplicated components and operations is thereby omitted.

The first MZI 13A has the LSB section 22A and the MSB section 22B arranged in each of the upper arm 21A and the lower arm 21B of the optical waveguide 21. The first setting unit 33A sets the electrode length ratio of the LSB section 22A of the upper arm 21A:the MSB section 22B of the upper arm 21A to 1:2. Furthermore, the first setting unit 33A sets the amplitude ratio of the dither signal of the LSB driving signal of the upper arm 21A:the dither signal of the MSB driving signal of the upper arm 21A to 1:2. The first setting unit 33A sets the electrode length ratio of the LSB section 22A of the lower arm 21B:the MSB section 22B of the lower arm 21B to 1:2. Furthermore, the first setting unit 33A sets the amplitude ratio of the dither signal of the LSB driving signal of the lower arm 21B:the dither signal of the MSB driving signal of the lower arm 21B to 1:2. The first MZI 13A applies the LSB driving signal to the LSB sections 22A of the upper arm 21A and the lower arm 21B, and applies the MSB driving signal to the MSB sections 22B of the upper arm 21A and the lower arm 21B.

The second MZI 13B also has the LSB section 22A and the MSB section 22B arranged in each of the upper arm 21A and the lower arm 21B of the optical waveguide 21. The second setting unit 33B sets the electrode length ratio of the LSB section 22A of the upper arm 21A:the MSB section 22B of the upper arm 21A to 1:2. Furthermore, the second setting unit 33B sets the amplitude ratio of the dither signal of the LSB driving signal of the upper arm 21A:the dither signal of the MSB driving signal of the upper arm 21A to 1:2. The second setting unit 33B sets the electrode length ratio of the LSB section 22A of the lower arm 21B:the MSB section 22B of the lower arm 21B to 1:2. Furthermore, the second setting unit 33B sets the amplitude ratio of the dither signal of the LSB driving signal of the lower arm 21B:the dither signal of the MSB driving signal of the lower arm 21B to 1:2. The second MZI 13B applies the LSB driving signal to the LSB sections 22A of the upper arm 21A and the lower arm 21B, and applies the MSB driving signal to the MSB sections 22B of the upper arm 21A and the lower arm 21B.

The third MZI 13C also has the LSB section 22A and the MSB section 22B arranged in each of the upper arm 21A and the lower arm 21B of the optical waveguide 21. The third setting unit 33C sets the electrode length ratio of the LSB section 22A of the upper arm 21A:the MSB section 22B of the upper arm 21A to 1:2. Furthermore, the third setting unit 33C sets the amplitude ratio of the dither signal of the LSB driving signal of the upper arm 21A:the dither signal of the MSB driving signal of the upper arm 21A to 1:2. The third setting unit 33C sets the electrode length ratio of the LSB section 22A of the lower arm 21B:the MSB section 22B of the lower arm 21B to 1:2. Furthermore, the third setting unit 33C sets the amplitude ratio of the dither signal of the LSB driving signal of the lower arm 21B:the dither signal of the MSB driving signal of the lower arm 21B to 1:2. The third MZI 13C applies the LSB driving signal to the LSB sections 22A of the upper arm 21A and the lower arm 21B, and applies the MSB driving signal to the MSB sections 22B of the upper arm 21A and the lower arm 21B.

The fourth MZI 13D also has the LSB section 22A and the MSB section 22B arranged in each of the upper arm 21A and the lower arm 21B of the optical waveguide 21. The fourth setting unit 33D sets the electrode length ratio of the LSB section 22A of the upper arm 21A:the MSB section 22B of the upper arm 21A to 1:2. Furthermore, the fourth setting unit 33D sets the amplitude ratio of the dither signal of the LSB driving signal of the upper arm 21A:the dither signal of the MSB driving signal of the upper arm 21A to 1:2. The fourth setting unit 33D sets the electrode length ratio of the LSB section 22A of the lower arm 21B:the MSB section 22B of the lower arm 21B to 1:2. Furthermore, the fourth setting unit 33D sets the amplitude ratio of the dither signal of the LSB driving signal of the lower arm 21B:the dither signal of the MSB driving signal of the lower arm 21B to 1:2. The fourth MZI 13D applies the LSB driving signal to the LSB sections 22A of the upper arm 21A and the lower arm 21B, and applies the MSB driving signal to the MSB sections 22B of the upper arm 21A and the lower arm 21B.

The first generating unit 32A includes a dither-signal generating unit 51, a two-fold amplifier 52, a first superimposing unit 53A, a second superimposing unit 53B, a first branching unit 54A, and a second branching unit 54B. Furthermore, the first generating unit 32A includes a first inverting unit 55A, a second inverting unit 55B, a first amplifying unit 56A, and a second amplifying unit 56B. The dither-signal generating unit 51 generates a reference dither signal. The two-fold amplifier 52 amplifies the reference dither signal generated by the dither-signal generating unit 51 to be doubled, to generate a two-fold dither signal to be superimposed on the LSB driving signal. The first superimposing unit 53A superimposes the two-fold dither signal from the two-fold amplifier 52 on the NRZ signal from the NRZ generating unit 31, to generate the LSB driving signal, and applies the LSB driving signal to the first branching unit 54A.

The first branching unit 54A branches the LSB driving signal from the first superimposing unit 53A, and applies the branched LSB driving signals to the LSB section 22A of the lower arm 21B, and to the first inverting unit 55A. The first inverting unit 55A inverts the LSB driving signal, and applies the inverted LSB driving signal to the LSB section 22A of the upper arm 21A.

The second superimposing unit 53B superimposes the reference dither signal from the dither-signal generating unit 51 on the NRZ signal from the NRZ generating unit 31, to generate the MSB driving signal, and applies the MSB driving signal to the second branching unit 54B. The second branching unit 54B branches the MSB driving signal from the second superimposing unit 53B, and applies the branched MSB driving signal to the MSB section 22B of the lower arm 21B, and to the second inverting unit 55B. The second inverting unit 55B inverts the MSB driving signal, and applies the inverted MSB driving signal to the MSB section 22B of the upper arm 21A.

The first MZI 13A applies the LSB driving signal and the MSB driving signal to the LSB section 22A and the MSB section 22B of the lower arm 21B. Furthermore, the first MZI 13A applies the inverted signal of the LSB driving signal and the inverted signal of the MSB driving signal to the LSB section 22A and the MSB section 22B of the upper arm 21A. As a result, in the quaternary optical modulation signal of the first MZI 13A, the dither signals of the level 1 and the level 2 are canceled out by each other, and degradation of the signal quality by the dither signals at the level 1 and the level 2 can be suppressed.

The second MZI 13B applies the LSB driving signal and the MSB driving signal to the LSB section 22A and the MSB section 22B of the lower arm 21B. Furthermore, the second MZI 13B applies the inverted signal of the LSB driving signal and the inverted signal of the MSB driving signal to the LSB section 22A and the MSB section 22B of the upper arm 21A. As a result, in the quaternary optical modulation signal of the second MZI 13B, the dither signals of the level 1 and the level 2 are canceled out by each other, and degradation of the signal quality by the dither signals at the level 1 and the level 2 can be suppressed.

Furthermore, the third MZI 13C applies the LSB driving signal and the MSB driving signal to the LSB section 22A and the MSB section 22B of the lower arm 21B. Furthermore, the third MZI 13C applies the inverted signal of the LSB driving signal and the inverted signal of the MSB driving signal to the LSB section 22A and the MSB section 22B of the upper arm 21A. As a result, in the quaternary optical modulation signal of the third MZI 13C, the dither signals of the level 1 and the level 2 are canceled out by each other, and degradation of the signal quality by the dither signals at the level 1 and the level 2 can be suppressed.

The fourth MZI 13D applies the LSB driving signal and the MSB driving signal to the LSB section 22A and the MSB section 22B of the lower arm 21B. The fourth MZI 13D applies the inverted signal of the LSB driving signal and the inverted signal of the MSB driving signal to the LSB section 22A and the MSB section 22B of the upper arm 21A. As a result, in the quaternary optical modulation signal of the fourth MZI 13D, the dither signals of the level 1 and the level 2 are canceled out by each other, and degradation of the signal quality by the dither signals at the level 1 and the level 2 can be suppressed.

The first bias-control unit 44A arranges a bias unit 25 in the upper arm 21A in the first MZI 13A, and applies a bias voltage to the bias unit 25 such that the frequency component of the dither signal from the first component-detecting unit 43A is minimized. As a result, the first MZI 13A can converge the biases of the upper arm 21A and the lower arm 21B to an optimal point.

The second bias-control unit 44B arranges a bias unit 25 in the upper arm 21A in the second MZI 13B, and applies a bias voltage to the bias unit 25 such that the frequency component of the dither signal from the second component-detecting unit 43B is minimized. As a result, the second MZI 13B can converge the biases of the upper arm 21A and the lower arm 21B to an optimal point. The third bias-control unit 44C arranges a bias unit 25 in the upper arm 21A in the third MZI 13C, and applies a bias voltage to the bias unit 25 such that the frequency component of the dither signal from the third component-detecting unit 43C is minimized. As a result, the third MZI 13C can converge the biases of the upper arm 21A and the lower arm 21B to an optimal point. The fourth bias-control unit 44D arranges a bias unit 25 in the upper arm 21A in the fourth MZI 13D, and applies a bias voltage to the bias unit 25 such that the frequency component of the dither signal from the fourth component-detecting unit 43D is minimized. As a result, the fourth MZI 13D can converge the biases of the upper arm 21A and the lower arm 21B to an optimal point.

Note that in the optical transmission device 1 of the first embodiment, the electrode length ratio of the LSB section 22A and the MSB section 22B of the first MZI 13A is 1:2, the amplitude ratio of (the dither signal superimposed on the LSB driving signal):(the dither signal superimposed on the MSB driving signal) is set to 2:1. However, the electrode length ratio of the LSB section 22A and the MSB section 22B of the first MZI 13A may be set to 1:n, and it may set as (the dither signal superimposed on the LSB driving signal):(the dither signal superimposed on the MSB driving signal)=n:1. Such a form of implementation will be described as a third embodiment.

[c] Third Embodiment

Figure 12:
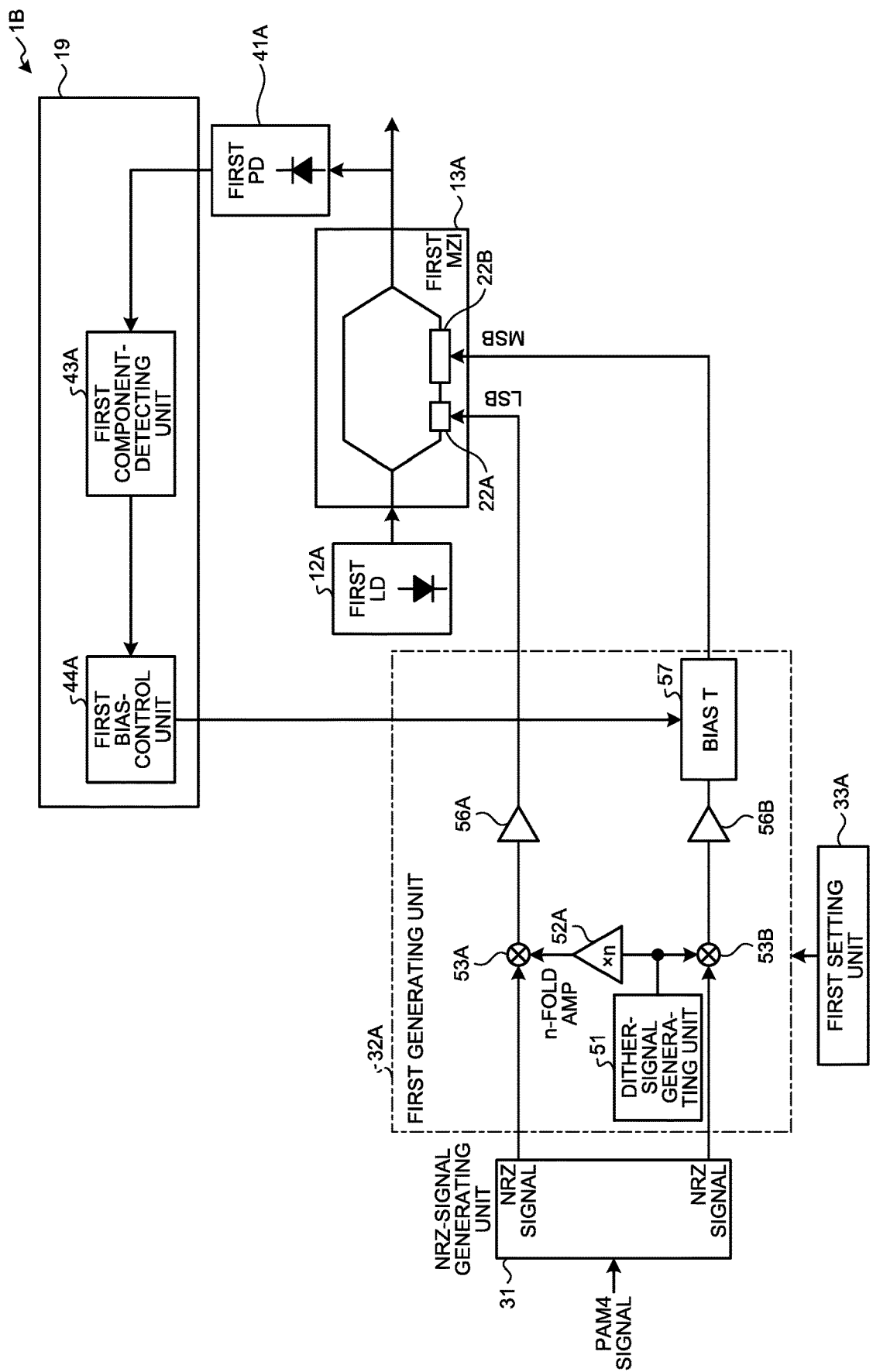
FIG. 12 is an illustration of an example of a transmission DSP, an LD driving unit, an MZI driving unit, and an MCU in an optical transmission device of a third embodiment.

FIG. 12 is an illustration of an example of the transmission DSP 11, the LD driving unit 12, the MZI driving unit 13, and the MCU 19 in an optical transmission device 1B of the third embodiment. In the optical transmission device 1B, the electrode length ratio of the LSB section 22A and the MSB section 22B of the first MZI 13A is set to 1:n, and the amplitude ratio of (the dither signal superimposed on the LSB driving signal):(the dither signal superimposed on the MSB driving signal) is set to n:1. The first generating unit 32A of the first MZI 13A includes the dither-signal generating unit 51, an n-fold amplifier 52A, the first superimposing unit 53A, the second superimposing unit 53B, the first amplifying unit 56A, the second amplifying unit 56B, and a bias T 57.

The dither-signal generating unit 51 generates a reference dither signal. The n-fold amplifier 52A amplifies the reference dither signal generated by the dither-signal generating unit 51 to be multiplied n-fold, to generate an n-fold dither signal to be superimposed on the LSB driving signal. The first superimposing unit 53A superimposes the n-fold dither signal on the NRZ signal from the NRZ generating unit 31, to generate the LSB driving signal, and applies the LSB driving signal to the LSB section 22A of the lower arm 21B. The second superimposing unit 53B superimposes the reference dither signal on the NRZ signal from the NRZ generating unit 31, to generate the MSB driving signal, and applies the MSB driving signal to the MSB section of the lower arm 21B. The bias T 57 adds a bias value from the first bias-control unit 44A to the MSB driving signal from the second amplifying unit 56B. Note that the first bias-control unit 44A generates a bias value that converges the biases of the upper arm 21A and the lower arm 21B to an optimal point based on the frequency component of the dither signal detected by the first component-detecting unit 43A. The bias T 57 adds the bias value from the first bias-control unit 44A to the MSB driving signal, and applies the resultant MSB driving signal to the MSB section 22B.

The first MZI 13A applies the LSB driving signal and the MSB driving signal to the LSB section 22A and the MSB section 22B of the lower arm 21B. As a result, in the first MZI 13A, the power differences among the optical levels are large, and fluctuation of the optical level caused by variation of the driving signal of the first MZI 13A is large, and degradation of the signal quality by the dither signal can be suppressed in a quaternary optical modulation signal.

For the convenience of explanation, a case in which the first generating unit 32A applies the LSB driving signal and the MSB driving signal to the LSB section 22A and the MSB section 22B of the lower arm 21B of the first MZI 13A has been described. However, the second generating unit 32B, the third generating unit 32C, and the fourth generating unit 32D may be configured to apply the LSB driving signal and the MSB driving signal to the LSB section 22A and the MSB section 22B of the lower arm 21B, and alterations can be made as appropriate.

The second MZI 13B applies the LSB driving signal and the MSB driving signal to the LSB section 22A and the MSB section 22B of the lower arm 21B. As a result, in the second MZI 13B, the power differences among the optical levels are large, and fluctuation of the optical level caused by variation of the driving signal of the second MZI 13B is large, and degradation of the signal quality by the dither signal can be suppressed in a quaternary optical modulation signal.

The third MZI 13C applies the LSB driving signal and the MSB driving signal to the LSB section 22A and the MSB section 22B of the lower arm 21B. As a result, in the third MZI 13C, the power differences among the optical levels are large, and fluctuation of the optical level caused by variation of the driving signal of the third MZI 13C is large, and degradation of the signal quality by the dither signal can be suppressed in a quaternary optical modulation signal.

The fourth MZI 13D applies the LSB driving signal and the MSB driving signal to the LSB section 22A and the MSB section 22B of the lower arm 21B. As a result, in the fourth MZI 13D, the power differences among the optical levels are large, and fluctuation of the optical level caused by variation of the driving signal of the fourth MZI 13D is large, and degradation of the signal quality by the dither signal can be suppressed in a quaternary optical modulation signal.

In the first MZI 13A, the bias value is added to the MSB driving signal in the bias T 57, and the MSB driving signal is applied to the MSB section 22B. As a result, the first MZI 13A can converge biases of the upper arm 21A and the lower arm 21B to an optimal point.

In the second MZI 13B, the bias value is added to the MSB driving signal in the bias T 57, and the MSB driving signal is applied to the MSB section 22B. As a result, the second MZI 13B can converge biases of the upper arm 21A and the lower arm 21B to an optimal point.

In the third MZI 13C, the bias value is added to the MSB driving signal in the bias T 57, and the MSB driving signal is applied to the MSB section 22B. As a result, the third MZI 13C can converge biases of the upper arm 21A and the lower arm 21B to an optimal point.

In the fourth MZI 13D, a bias value is added to the MSB driving signal in the bias T 57, and the MSB driving signal is applied to the MSB section 22B. As a result, the fourth MZI 13D can converge biases of the upper arm 21A and the lower arm 21B to an optimal point.

For the optical transmission device 1B of the third embodiment described above, a case in which the bias value is adjusted to converge the biases of the upper arm 21A and the lower arm 21B has been described, but it is not limited thereto. Such a form of implementation will be described as a fourth embodiment.

[d] Fourth Embodiment

Figure 13:
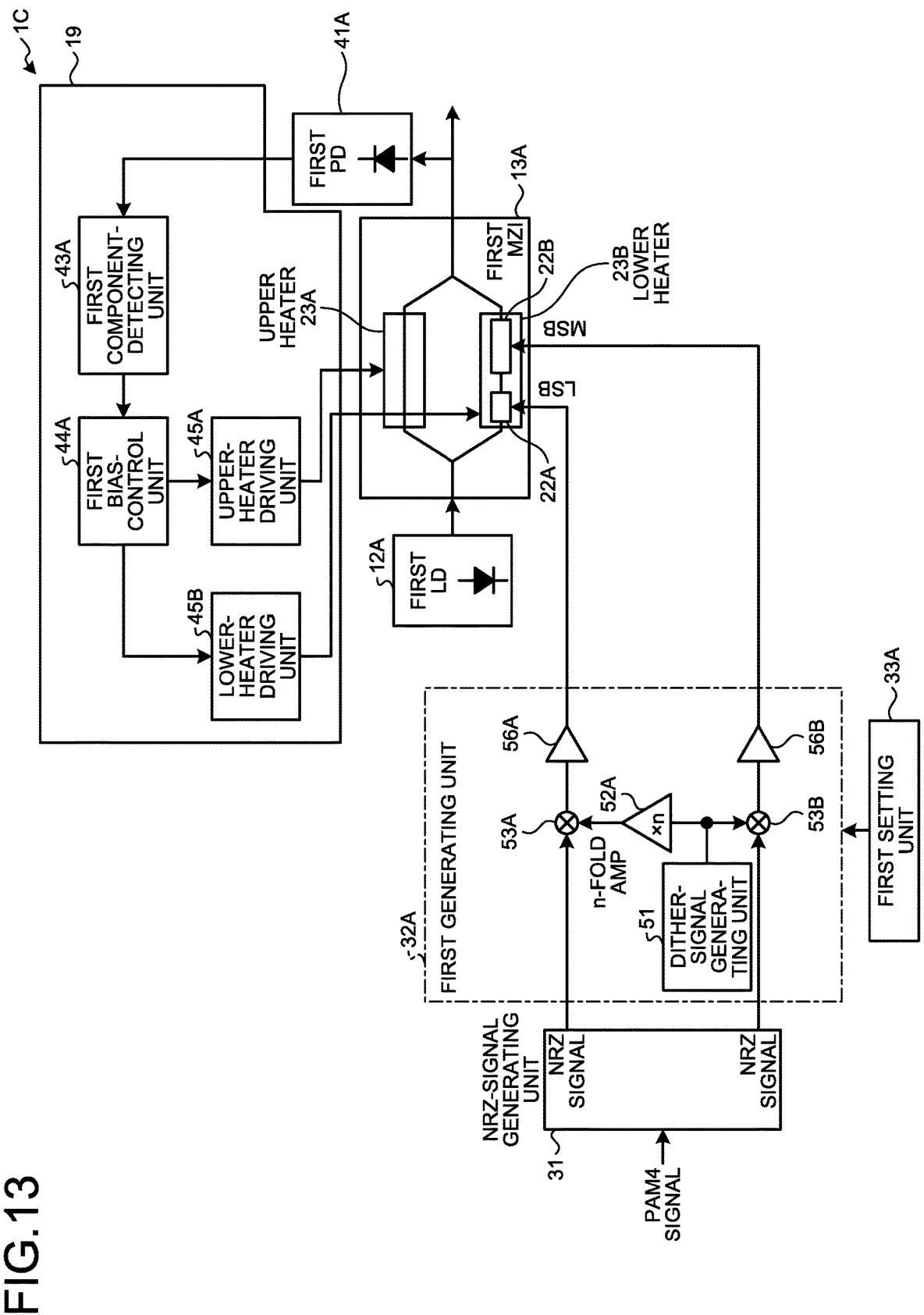
FIG. 13 is an illustration of an example of a transmission DSP, an LD driving unit, an MZI driving unit, and an MCU in an optical transmission device of a fourth embodiment.
Figure 14:
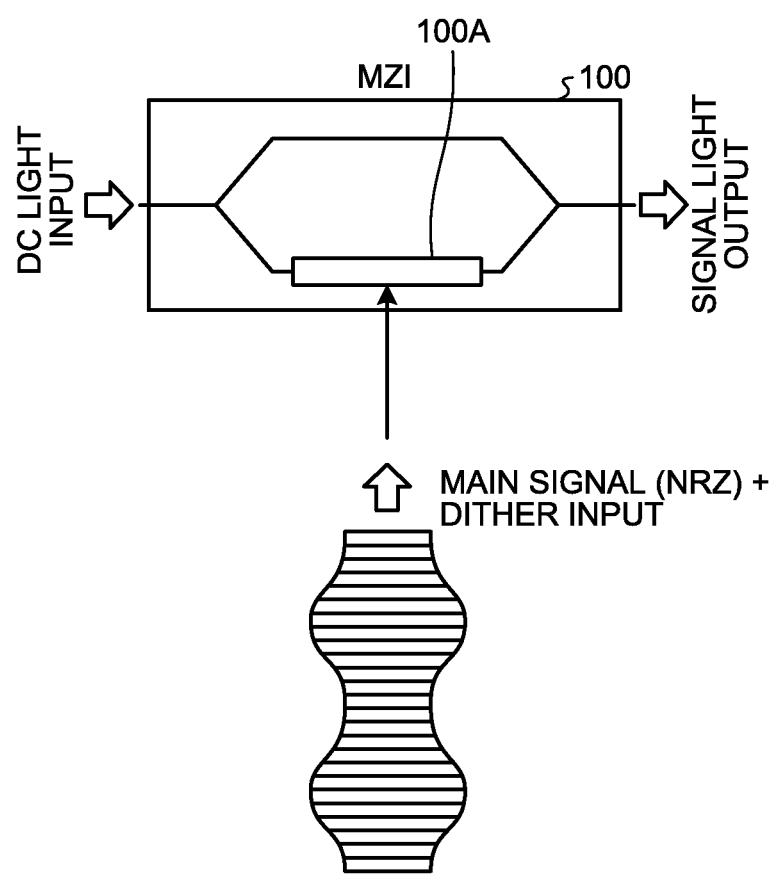
FIG. 14 is an illustration of an example of a driving signal applied to a conventional MZI.

FIG. 13 is an illustration of an example of the transmission DSP 11, the LD driving unit 12, the MZI driving unit 13, and the MCU 19 in an optical transmission device 1C of the fourth embodiment. Common reference signs are assigned to common components with the optical transmission device 1B of the third embodiment, and explanation of duplicated components and operations is thereby omitted. The MCU 19 includes an upper-heater driving unit 45A and a lower-heater driving unit 45B, in addition to the first PD 41A, the first component-detecting unit 43A, and the first bias-control unit 44A. Moreover, the first MZI 13A includes an upper heater 23A and a lower heater 23B in addition to the LSB section 22A and the MSB section 22B that are arranged in the lower arm 21B of the optical waveguide 21.

The upper heater 23A is a heater that is arranged in the upper arm 21A of the first MZI 13A, and that adjusts the temperature of the optical waveguide 21 in the upper arm 21A. The lower heater 23B is a heater that that is arranged in the lower arm 21B of the first MZI 13A, and that adjusts the temperature of the optical waveguide 21 in the lower arm 21B. The upper-heater driving unit 45A drives and controls the upper heater 23A. The lower-heater driving unit 45B drives and controls the lower heater 23B. The first bias-control unit 44A controls the upper-heater driving unit 45A and the lower-heater driving unit 45B to adjust the temperature of the upper heater 23A and the lower heater 23B to perform ABC.

The first setting unit 33A sets the electrode length ratio of the LSB section 22A and the MSB section 22B of the first MZI 13A to 1:n, and the amplitude ratio of (the dither signal superimposed on the LSB driving signal):(the dither signal superimposed on the MSB driving signal) to n:1. The first generating unit 32A applies the LSB driving signal to the LSB section 22A, and applies the MSB driving signal to the MSB section 22B based on settings of the first setting unit 33A. As a result, in the quaternary optical modulation signal of the first MZI 13A, the dither signals of the level 1 and the level 2 are canceled out by each other, and degradation of the signal quality by the dither signal at the level 1 and the level 2 is suppressed.

The second generating unit 32B applies the LSB driving signal to the LSB section 22A, and applies the MSB driving signal to the MSB section 22B based on settings of the second setting unit 33B. As a result, in the quaternary optical modulation signal of the second MZI 13B, the dither signals of the level 1 and the level 2 are canceled out by each other, and degradation of the signal quality by the dither signal at the level 1 and the level 2 is suppressed.

The third generating unit 32C applies the LSB driving signal to the LSB section 22A, and applies the MSB driving signal to the MSB section 22B based on settings of the third setting unit 33C. As a result, in the quaternary optical modulation signal of the third MZI 13C, the dither signals of the level 1 and the level 2 are canceled out by each other, and degradation of the signal quality by the dither signal at the level 1 and the level 2 is suppressed.

The fourth generating unit 32D applies the LSB driving signal to the LSB section 22A, and applies the MSB driving signal to the MSB section 22B based on settings of the fourth setting unit 33D. As a result, in the quaternary optical modulation signal of the fourth MZI 13D, the dither signals of the level 1 and the level 2 are canceled out by each other, and degradation of the signal quality by the dither signal at the level 1 and the level 2 is suppressed.

The first bias-control unit 44A controls the upper-heater driving unit 45A and the lower-heater driving unit 45B that perform temperature adjustment of the upper heater 23A and the lower heater 23B in the first MZI 13A such that the frequency component of the dither signal from the first component-detecting unit 43A is minimized. The first bias-control unit 44A controls a bias according to a temperature difference between the upper arm 21A and the lower arm 21B. As a result, the first MZI 13A can converge biases of the upper arm 21A and the lower arm 21B to an optimal point.

The second bias-control unit 44B controls the upper-heater driving unit 45A and the lower-heater driving unit 45B that perform temperature adjustment of the upper heater 23A and the lower heater 23B in the second MZI 13B such that the frequency component of the dither signal from the second component-detecting unit 43B is minimized. The second bias-control unit 44B controls a bias according to a temperature difference between the upper arm 21A and the lower arm 21B. As a result, the second MZI 13B can converge biases of the upper arm 21A and the lower arm 21B to an optimal point.

The third bias-control unit 44C controls the upper-heater driving unit 45A and the lower-heater driving unit 45B that perform temperature adjustment of the upper heater 23A and the lower heater 23B in the third MZI 13C such that the frequency component of the dither signal from the third component-detecting unit 43C is minimized. The third bias-control unit 44C controls a bias according to a temperature difference between the upper arm 21A and the lower arm 21B. As a result, the third MZI 13C can converge biases of the upper arm 21A and the lower arm 21B to an optimal point.

The fourth bias-control unit 44D controls the upper-heater driving unit 45A and the lower-heater driving unit 45B that perform temperature adjustment of the upper heater 23A and the lower heater 23B in the fourth MZI 13D such that the frequency component of the dither signal from the fourth component-detecting unit 43D is minimized. The fourth bias-control unit 44D controls a bias according to a temperature difference between the upper arm 21A and the lower arm 21B. As a result, the fourth MZI 13D can converge biases of the upper arm 21A and the lower arm 21B to an optimal point.

Moreover, illustrated respective components of respective parts are not necessarily required to be configured physically as illustrated. That is, specific forms of distribution and integration of the respective parts are not limited to the ones illustrated, and all or a part thereof can be configured to be distributed or integrated functionally or physically in arbitrary units according to various kinds of loads, usage conditions, and the like.

Furthermore, as for the respective processing functions performed by the respective devices, all or an arbitrary part thereof can be implemented on a central processing unit (CPU) (or a microcomputer, such as a micro processing unit (MPU) and an MCU). Moreover, it is needless to say that all or a part of the respective processing functions can be implemented on a computer program that is analyzed and executed by a CPU (or a microcomputer, such as an MPU and MCU), or on hardware by wired logic.

As one aspect, it is possible to suppress degradation of a signal quality by a dither signal in a quaternary or more-value optical modulation signal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A Mach-Zehnder optical modulator comprising:
   a first section and a second section that are arranged in at least one arm out of two arms in an optical waveguide through which an optical signal passes;
   a creating unit that creates a first driving signal to be applied to the first section, and a second driving signal to be applied to the second section;
   a generating unit that generates a first dither signal to be superimposed on the first driving signal, and a second dither signal to be superimposed on the second driving signal;
   an optical modulating unit that optical modulates the optical signal into a quaternary or more value optical modulation signal by applying the first driving signal on which the first dither signal is superimposed to the first section, and by applying the second driving signal on which the second dither signal is superimposed to the second section; and
   a setting unit that sets, when a length of the second section is n times as long as the length of the first section, the first dither signal and the second dither signal to have a same phase, and sets such that an amplitude of the first dither signal is n times as large as the amplitude of the second dither signal.

2. The Mach-Zehnder optical modulator according to claim 1, wherein
   the setting unit sets the first dither signal and the second dither signal to have the same phase, and sets such that the amplitude of the first dither signal is n times as large as the amplitude of the second dither signal when a modulation efficiency of the second section is set to be n times as high as the modulation efficiency of the first section, instead of setting the length of the second section to n times as long as the length of the first section.

3. The Mach-Zehnder optical modulator according to claim 1, wherein
   the creating unit creates a pulse amplitude modulation signal as the first driving signal and the second driving signal.

4. The Mach-Zehnder optical modulator according to claim 1, wherein
   the generating unit includes
      a signal generating unit that generates the second dither signal;
      an amplifying unit that amplifies an amplitude of the second dither signal n fold;
      a first superimposing unit that handles the second dither signal that has been amplified n fold by the amplifying unit as the first dither signal, and that superimposes the first dither signal on the first driving signal; and
      a second superimposing unit that superimposes the second dither signal on the second driving signal.

5. The Mach-Zehnder optical modulator according to claim 1, further comprising:
   a component detecting unit that detects a frequency component of the first dither signal and the second dither signal from the optical modulation signal of the optical modulating unit; and
   a control unit that controls a bias of the optical waveguide to converge a bias of the optical modulating unit to an optimal point based on the frequency component detected by the component detecting unit.

6. The Mach-Zehnder optical modulator according to claim 1, further comprising:
   a component detecting unit that detects a frequency component of the first dither signal and the second dither signal from the optical modulation signal of the optical modulating unit; and
   a control unit that adjusts a heater of the arm of the optical waveguide based on the frequency component detected by the component detecting unit, and controls the heater so as to converge a bias of the optical modulating unit to an optimal point.

7. An optical modulation method that is performed by a Mach-Zehnder optical modulator that includes a first section and a second section that are arranged in at least one arm out of two arms in an optical waveguide through which an optical signal passes, and that optical modulates the optical signal into a quaternary or more value optical modulation signal by applying a driving signal to the first section and the second section, the method comprising:
   creating a first driving signal to be applied to the first section, and a second driving signal to be applied to the second section;
   generating a first dither signal to be superimposed on the first driving signal, and a second dither signal to be superimposed on the second driving signal;
   optical modulating the optical signal into the quaternary or more value optical modulation signal by applying the first driving signal on which the first dither signal is superimposed to the first section, and by applying the second driving signal on which the second dither signal is superimposed to the second section; and
   setting, when a length of the second section is n times as long as the length of the first section, the first dither signal and the second dither signal to have a same phase, and such that an amplitude of the first dither signal is n times as large as the amplitude of the second dither signal.

* * * * *